United States Patent
Kay et al.

(10) Patent No.: US 9,177,150 B1
(45) Date of Patent: Nov. 3, 2015

(54) DETECTING SETTING TAMPERING

(71) Applicant: GOOGLE INC., Mountain View, CA (US)

(72) Inventors: Erik Kay, Belmont, CA (US); Robert Shield, Montreal (CA); Marc-Andre Decoste, Montreal (CA); Dominic Battre, Munich (DE); William James Budge, Jr., Mountain View, CA (US)

(73) Assignee: Google Inc., Mountain View, CA (US)

( * ) Notice: Subject to any disclaimer, the term of this patent is extended or adjusted under 35 U.S.C. 154(b) by 61 days.

(21) Appl. No.: 14/096,559

(22) Filed: Dec. 4, 2013

(51) Int. Cl.
    *G06F 21/57* (2013.01)
(52) U.S. Cl.
    CPC ...................................... *G06F 21/57* (2013.01)
(58) Field of Classification Search
    None
    See application file for complete search history.

(56) References Cited

U.S. PATENT DOCUMENTS

2006/0031940 A1\* 2/2006 Rozman et al. ................. 726/27

OTHER PUBLICATIONS

Wallen, Repair multiple Internet Explorer issues with one application, TechRepublic, Oct. 2012.\*

\* cited by examiner

*Primary Examiner* — Minh Dinh
(74) *Attorney, Agent, or Firm* — Brake Hughes Bellermann LLP

(57) ABSTRACT

A computer implemented method includes generating a first cryptographic hash based on at least one setting associated with a browser at a first time, storing the first cryptographic hash as a first bit string, generating a second cryptographic hash as a second bit string, wherein the second cryptographic hash is based on the at least one setting associated with the browser at a second time, determining that a setting associated with the browser has changed and that the setting change was made outside of the browser based on a comparison of the first and second bit strings, and if the setting change was made outside of the browser, setting the setting to a default value.

20 Claims, 9 Drawing Sheets

| Name | Status | Type | Value |
|---|---|---|---|
| browser.panorama.animate_zoom | default | boolean | true |
| browser.places.smartBookmarksVersion | user set | integer | 4 |
| browser.popups.showPopupBlocker | default | boolean | true |
| browser.preferences.animateFadeIn | default | boolean | false |
| browser.preferences.inContent | default | boolean | false |
| browser.preferences.instantApply | default | boolean | false |
| browser.privatebrowsing.autostart | default | boolean | false |
| browser.rights.3.shown | user set | boolean | true |
| browser.rights.version | default | integer | 3 |
| browser.safebrowsing.debug | default | boolean | false |
| browser.safebrowsing.enabled | default | boolean | true |
| browser.safebrowsing.gethashURL | default | string | http://safebrowsing... |
| browser.safebrowsing.id | default | string | navclient-auto-ffox |
| browser.safebrowsing.keyURL | default | string | https://sb-ssl.google... |
| browser.safebrowsing.malware.enabled | default | boolean | true |
| browser.safebrowsing.malware.reportURL | default | string | http://safebrowsing... |
| browser.safebrowsing.reportErrorURL | default | string | http://%LOCALE%.... |
| browser.safebrowsing.reportGenericURL | default | string | http://%LOCALE%.... |
| browser.safebrowsing.reportMalwareErrorURL | default | string | http://%LOCALE%.... |
| browser.safebrowsing.reportMalwareURL | default | string | http://%LOCALE%.... |
| browser.safebrowsing.reportPhishURL | default | string | http://safebrowsing... |
| browser.safebrowsing.reportURL | default | string | http://safebrowsing... |
| browser.safebrowsing.updateURL | default | string | https://www.mozilla... |
| browser.safebrowsing.warning.infoURL | default | string | |
| browser.search.context.loadInBackground | default | boolean | false |
| browser.search.defaultenginename | default | string | Google |
| browser.search.log | default | boolean | false |
| browser.search.official | default | boolean | true |
| browser.search.openintab | default | boolean | false |
| browser.search.order.1 | default | string | Google |
| browser.search.order.2 | default | string | Yahoo |
| browser.search.order.3 | default | string | Bing |

FIG. 2

DETECTING SETTING TAMPERING

FIELD

Embodiments relate to detecting when settings associated with a browser have been changed.

BACKGROUND

Generally, a malicious software or "malware" is installed by a third party on a computer to disrupt a preferred operation of the computer. In some cases, as relates to a browser, the malware will change one or more settings for the browser. Changing the settings may cause the browser to operate in an unexpected or undesirable manner.

Accordingly, there is a need in the art for detecting when malware has changed settings associated with a browser.

SUMMARY

Accordingly, in the below description example embodiments disclose mechanisms for detecting setting changes based on changes in cryptographic hashes. Further, disclosed are mechanisms for changing settings back to default values and determining confidence levels associated with malicious setting changes.

In a general aspect, a computer implemented method includes generating a first cryptographic hash based on at least one setting associated with a browser at a first time, storing the first cryptographic hash as a first bit string, generating a second cryptographic hash as a second bit string, wherein the second cryptographic hash is based on the at least one setting associated with the browser at a second time, determining, by a processor, that a setting associated with the browser has changed and that the setting change was made outside of the browser based on a comparison of the first and second bit strings, and if the setting change was made outside of the browser, setting the setting to a default value. The default value is one of an install initial value and a last known setting stored in a datastore.

Implementations of the method can include one or more of the following features. For example, the at least one setting associated with a browser can be a data structure that includes a canonical representation that is then serialized to a string prior to being cryptographically hashed. The first cryptographic hash and the second cryptographic hash can be performed by a central service associated with a remote computing device. Setting the setting to a default value can include determining a confidence level based on the setting associated with the browser, and displaying a window based on the confidence level associated with the changed setting.

The method can further include requesting a confidence level based on the changed setting from a remote datastore, determining if malicious code has been injected into code associated with the browser, and ranking a confidence that the setting has been tampered with based on at least one of the confidence level and the determining if malicious code has been injected. The bit strings can be generated based on a cryptographic hash function including at least one key as input, and the at least one key is at least one of unique to the browser, unique to a computing device, and unique to a user of the computing device. At least one bit string can be encrypted using a key that is unique to the user prior to storing the bit string in a datastore. The default value can be one of a system default value and a last known setting stored in a datastore.

In another general aspect, a computer implemented method includes generating a new setting associated with the browser based on an existing setting associated with the browser, setting a value associated with the new setting to a corresponding value of the existing setting, monitoring the existing setting and determining a setting associated with the browser has changed if the existing setting changes. The method may further include storing information corresponding to the changed setting associated with the browser in a datastore. Implementations can include one or more of the following features. For example, the new setting can be generated during an upgrade process associated with the browser.

In still another general aspect, a non-transitory computer-readable storage medium having stored thereon computer executable program code which, when executed on a computer system, causes the computer system to perform steps including generating a first cryptographic hash based on at least one setting associated with a browser at a first time, store the first cryptographic hash as a first bit string, generating a second cryptographic hash as a second bit string, wherein the second cryptographic hash is based on the at least one setting associated with the browser at a second time, determining, by a processor, that a setting associated with the browser has changed and that the setting change was made outside of the browser based on a comparison of the first and second bit strings, and if the setting change was made outside of the browser, setting the setting to a default value.

Implementations of the steps can include one or more of the following features. For example, the at least one setting associated with a browser can be a data structure that includes a canonical representation that is then serialized to a string prior to being cryptographically hashed. The first cryptographic hash and the second cryptographic hash can be performed by a central service associated with a remote computing device. Setting the setting to a default value can include determining a confidence level based on the setting associated with the browser, and displaying a window based on the confidence level associated with the changed setting.

The steps can further include requesting a confidence level based on the changed setting from a remote datastore, determining if malicious code has been injected into code associated with the browser, and ranking a confidence that the setting has been tampered with based on at least one of the confidence level and the determining if malicious code has been injected. The bit strings can be generated based on a cryptographic hash function including at least one key as input, and the at least one key is at least one of unique to the browser, unique to a computing device, and unique to a user of the computing device. At least one bit string can be encrypted using a key that is unique to the user prior to storing the bit string in a datastore. The default value can be one of a system default value and a last known setting stored in a datastore.

BRIEF DESCRIPTION OF THE DRAWINGS

FIG. 2 is an example screen capture of a setting change tool or mechanism for a browser.

DETAILED DESCRIPTION OF THE EMBODIMENTS

Figure 1:
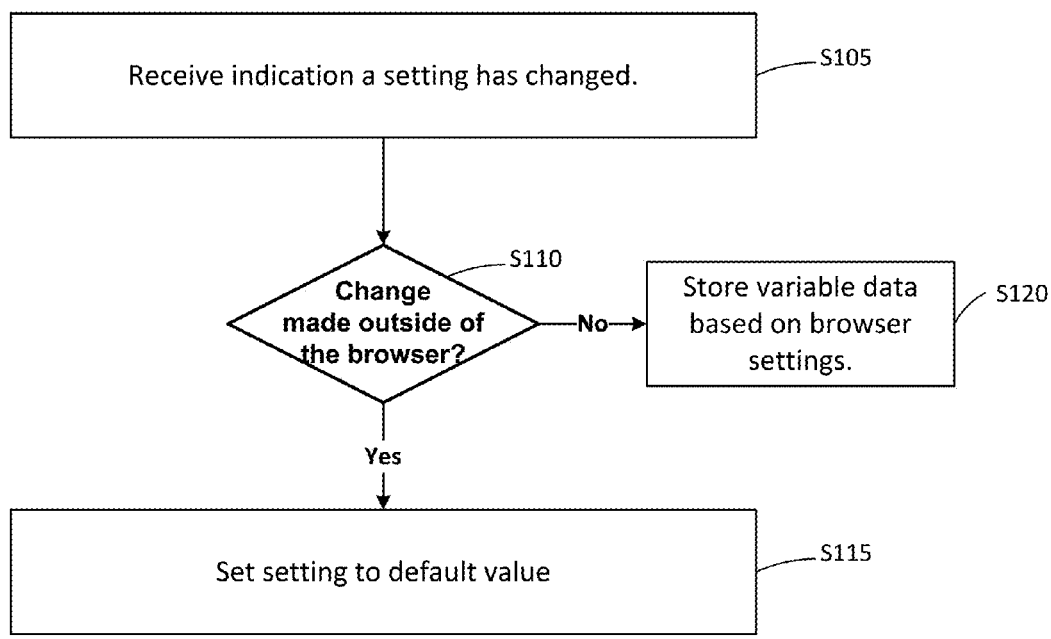
FIG. 1 is a flowchart of a method of detecting a setting has been tampered with according to at least one example embodiment.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Furthermore, the figures are intended to illustrate the general characteristics of methods and/or structure utilized in certain example embodiments and to supplement the written description provided below. These figures are not, however, to scale and may not precisely reflect the precise structural or performance characteristics of any given embodiment, and should not be interpreted as defining or limiting the range of values or properties encompassed by example embodiments. For example, the structural elements may be reduced or exaggerated for clarity. The use of similar or identical reference numbers in the various drawings is intended to indicate the presence of a similar or identical element or feature.

Typically, malware is installed unbeknownst to a user of a browser. For example, the user may visit a webpage configured to install the malware in the background when the webpage is opened. For example, the webpage may include a script that executes when the webpage opens. The script (e.g., Java code) may be configured as the malware and change some setting or configured to install some software as malware. In another example, the user may install software and, without fully understanding the implications, allow the software (e.g., the installation tool) to install the malware together with the desired software. In either case, the malware (through operation of software code associated with the malware installation) can change a setting of the browser to an undesirable value. In one example, the changed setting could be a default homepage setting, a default new tab page setting, and/or a default search engine setting. The corresponding organization associated with the default homepage, the default new tab page, and/or the default search engine may have a revenue stream (e.g., advertising) associated with a number of views or "hits" on the webpage. Therefore, the installed malware could have a financial impact on the target of the malware. In another example, the organization responsible for creation and installation of the malware may stand to benefit financially from the installed malware by redirecting the browser to some webpages.

Figure 8:
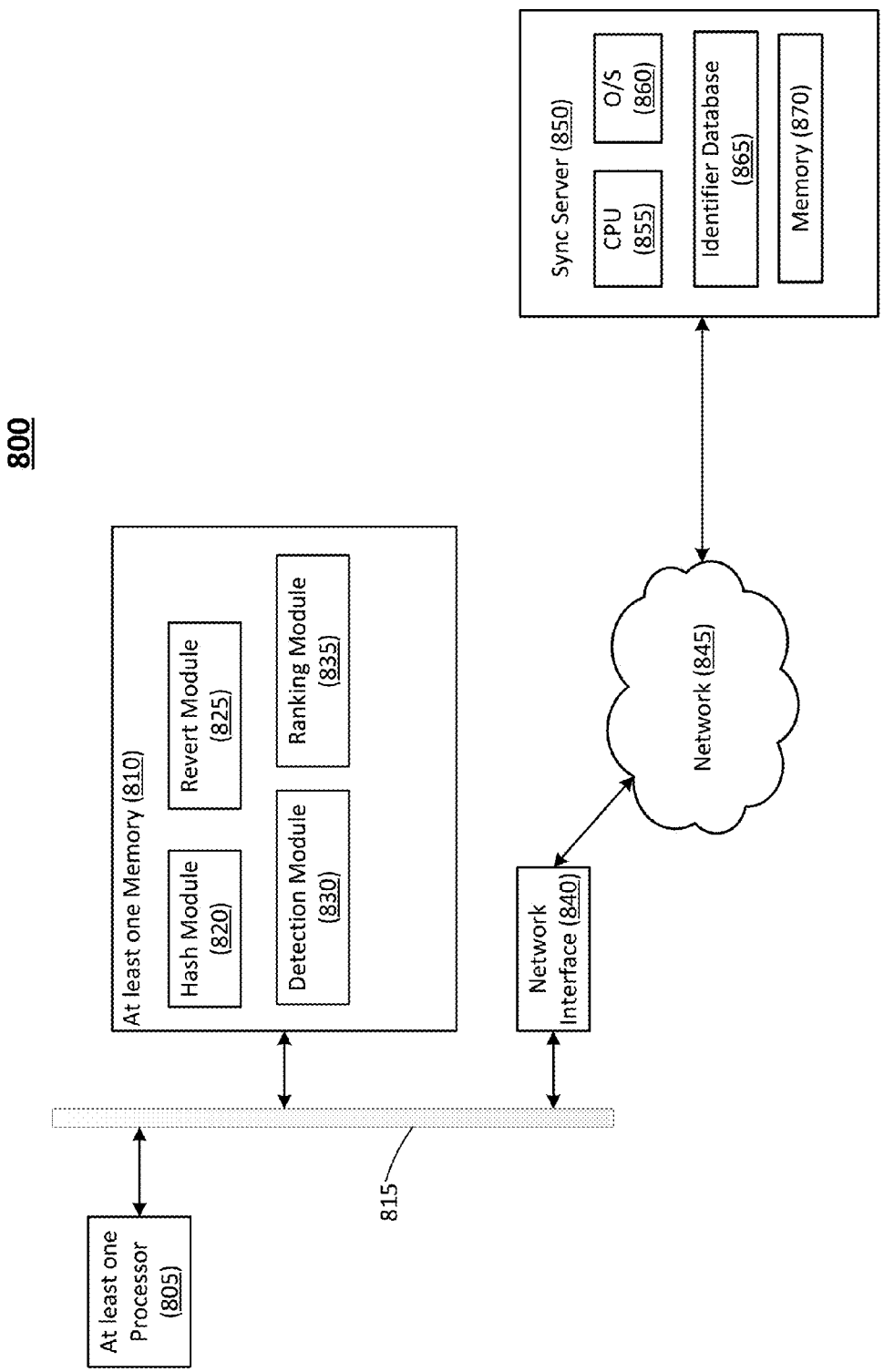
FIG. 8 is a schematic block diagram of an apparatus according to at least one example embodiment.

FIGS. 1 and 3-6 are flowcharts of methods according to example embodiments. The steps described with regard to FIGS. 1 and 3-6 may be performed due to the execution of software code stored in a memory (e.g., at least one memory 810 described below) associated with an apparatus (e.g., as shown in FIG. 8) and executed by at least one processor (e.g., at least one processor 805 described below) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 1 and 3-6.

FIG. 1 is a flowchart of a method of detecting a setting that has been tampered with according to at least one example embodiment. In the description below, the term setting is used and refers to user configured variables associated with a software application (e.g., a browser). However, a setting may also referred to herein as an option or a parameter.

As shown in FIG. 1, in step S105, an indication that a setting has been changed is received. For example, a setting may include any configurable data that may fall under the "Settings" selection, control or dropdown of a browser. A setting may include a description of the setting as well as an associated value or set value. For example, an "On Startup" setting in a browser may include a selection (e.g., as a radio selector) of associated values or set values (e.g., "Open New Tab", "Continue Where Last Left Off", and "Open Specific Page"). One or more of the associated values or set values may include an associated variable value further defining the setting. For example, the "Open Specific Page" may include an associated variable value defining a web page or uniform resource locator (URL) (e.g., www.myhomepage.com) to open for the setting "On Startup".

The indication that a setting has been changed may result from a user changing the setting. However, the indication may result from an unauthorized change (e.g., some malware making the change). The indication of the setting change may be based on a processor (e.g., processor 805) executing code functioning to perform a monitoring of the settings, checking the settings on a time interval, a report from another process or the like.

In step S110, whether the change was made as a direct result of a user interacting with standard setting change tool or mechanism is determined. A change that is not made as a direct result of a user interacting with standard setting change tool or mechanism can be known as a change that is made outside of a browser. A change that is made as a direct result of a user interacting with a standard setting change tool or mechanism can be known as a change that is made within a browser. If the changes made outside the browser, processing continues to step S115. Otherwise, processing moves to step S120.

For example, any change that is not the direct result of a user interacting with standard setting change tool or mechanism may be determined as having been made outside of the browser. For example, upon changing a setting (or initial installation of a browser) using the setting change tool or mechanism (e.g., as shown in FIG. 2), variable data (e.g., a bit string, a hash and/or cryptographic hash) based on the settings is saved (e.g., as a file or in a searchable data structure). FIG. 2 illustrates an example setting change tool or mechanism 200. In the setting change tool or mechanism 200, a setting 205 (e.g., browser.search.defaultenginename) may be selected (e.g., highlighted or double clicked) which may open a window 210 with a field 215 allowing a user of the browser to enter a value. The user may accept the change by clicking a button 220. Following the clicking of button 220, code may be executed that generates variable data (e.g., a bit string, a hash and/or cryptographic hash) based on the settings and saves the resultant variable data. Therefore, according to example embodiments, variable data is only generated using the setting change tool or mechanism (e.g., setting change tool or mechanism 200)

Accordingly, any change not made by using the setting change tool or mechanism cannot save or change the variable data. Therefore, should the variable data not match (a new hash of) the current settings, the difference can indicate a change was made without the setting change tool or mechanism (e.g., not intentionally by the user of the browser). In one example implementation, step S105 and step S110 may be combined into a single step where the variable data (e.g., a bit string, a hash and/or cryptographic hash) based on the settings is checked. If the variable data does not match or is not the same as (variable data based on) the current settings, the settings have changed and the changes were made outside of the browser. The changes were made outside of the browser because any changes by the browser (e.g., using the setting change tool or mechanism) result in updating the variable data.

In step S115 the setting is set to a default value. For example, in this implementation, the change being made outside of the browser indicates a malicious or undesirable change (e.g., a change made by malware). Therefore, the setting is set or reverted to a default value. The default value may be a system default value (e.g., an install initial value) or a last known setting stored in a datastore. For example, the "Open Specific Page" associated variable value defining the web page or URL to open "On Startup" may be set back to "www.myhomepage.com".

In step S120 variable data based on browser settings is stored. For example, a bit string may be generated based on the settings and/or setting values. The bit string may be generated using a hash function or a cryptographic hash function. As such, the variable data or bit string may be known as a digest. Accordingly, a bit string and a cryptographic hash may be used interchangeably throughout this disclosure. The variable data may be stored in a datastore associated with a memory (e.g., memory 810 or memory 870).

In some implementations the steps described above with regard to FIG. 1 occur as a background process (e.g., are executed by a processor in the background) with or without the browser being open. For example, a process (installed with the browser or as an add-on) may execute to determine if a setting associated with the browser has been tampered with in isolation from the browser itself. Further, as discussed below, the user may be given the option to confirm that the setting should be changed back to the default setting. Whether the confirmation is presented may be based on a confidence level that the setting has been tambered with.

Figure 3:
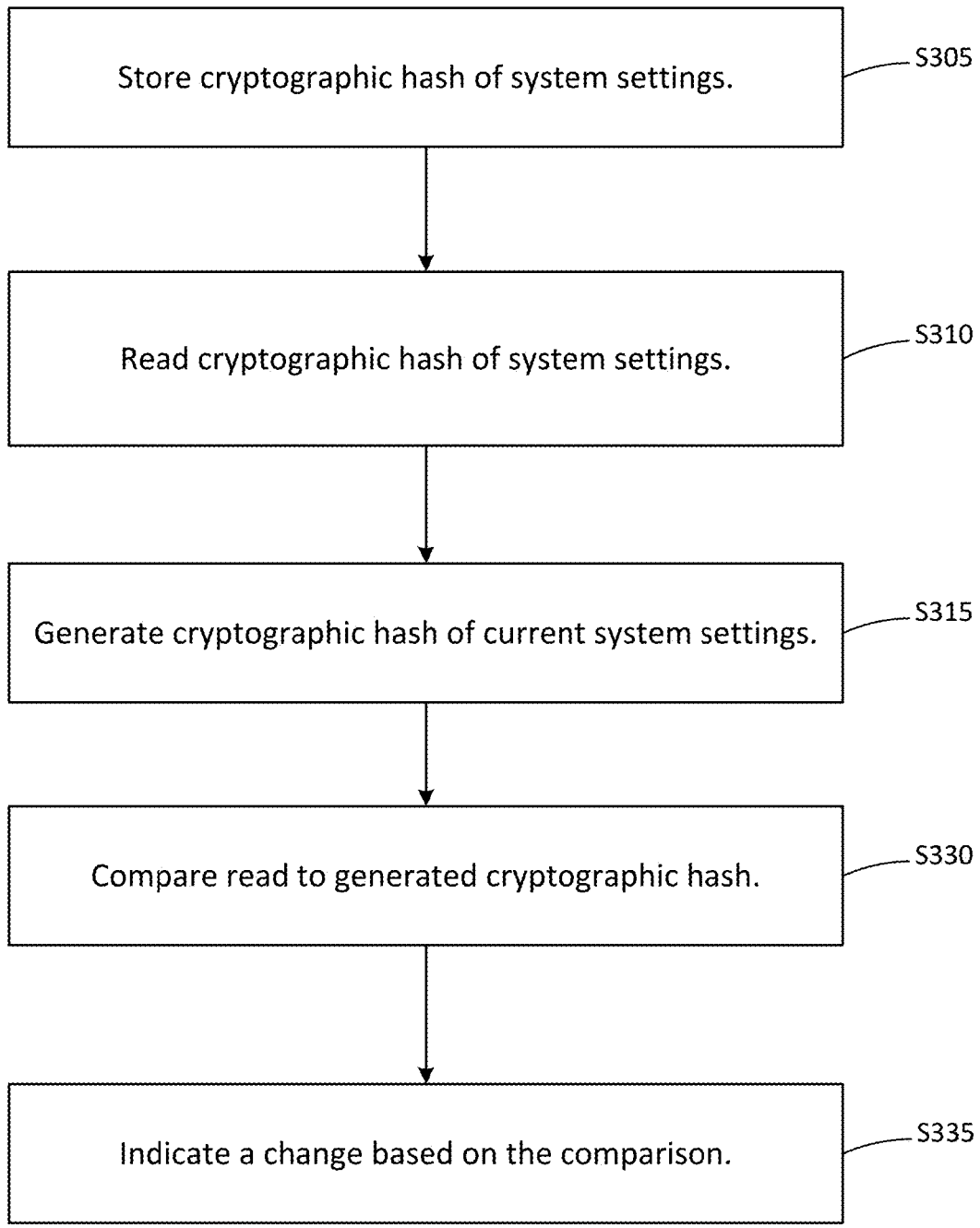
FIGS. 3-4 are flowcharts of other methods of detecting a setting has been tampered with according to at least one example embodiment.

FIG. 3 is a flowchart of detecting a setting has been tampered with according to at least one example embodiment. In one implementation, FIG. 3 describes generating a first cryptographic hash based on a plurality of settings as a first bit string; storing the cryptographic hash; and generating a second cryptographic hash based on the plurality of settings as a second bit string. Accordingly, a comparison of bit strings may include comparing the first bit string with the second bit string, and determining a setting associated with the browser has changed if the first bit string is not the same as the second bit string.

As shown in FIG. 3, in step S305 a cryptographic hash of system settings is stored. For example, the cryptographic hash may be a fixed size bit string or digest generated, by a processor (e.g., processor 805), using a cryptographic hash function with the settings as input. In this example, the cryptographic hash function or algorithm may include a Message-Digest Algorithm (MDA), a Secure Hash Algorithm (SHA), and the like. For example, the cryptographic hash may be a variable size bit string or digest generated using a cryptographic hash function with the settings as input. In this example, the cryptographic hash function or algorithm may include a hash of variable length (HAVAL) algorithm, and the like. The cryptographic hash of system settings may be a first cryptographic hash generated based on a plurality of settings associated with a browser at a first time and stored as a first bit string.

A hash or cryptographic hash is used to make it difficult for malware to change the setting value without being detected. Alternatively, or in addition to, a hash or cryptographic hash is used so that any comparison is computationally efficient. A hash function or cryptographic hash function based any given string, compilation of strings, or other input should generate the same output, hash or cryptographic hash, or digest. Therefore, rather than comparing each string one by one, two hashes or cryptographic hashes may be compared with each other to determine if the input string, compilation of strings, or other inputs are the same. There may be a large set of settings associated with a browser. For example, FIG. 2 illustrates just a portion of the possible settings. Therefore, checking these settings one, by one, would be an inefficient use of processing resources. Therefore, example implementations generate a hash or cryptographic hash based on the browser settings for use in determining if a change has been made.

The cryptographic hash function or algorithm may include at least one key. The at least one key may be unique to the browser, unique to the computing device, unique to a user of the computing device and/or a key generated based on the aforementioned keys. For example, the at least one key may be a device specific identification, a partition identification for the device, a user specific identification, a private key hidden in the binary of the browser and/or the like. For example, the cryptographic hash function or algorithm may use a key that is unique to the computing device to generate the cryptographic hash or digest. The cryptographic hash or digest may also be encrypted using the key that is unique to the user prior to storing the cryptographic hash or digest in the datastore.

The settings as input may include the setting (e.g., value) alone, the setting name/setting pair, and/or any other combination of characters associated with the settings. Alternatively, or in addition to, the settings may be data structures (e.g., arrays, lists, dictionaries) that include a canonical representation that is then serialized to a string which is then hashed. The cryptographic hash may be stored, by a processor (e.g., processor 805), in a datastore associated with a memory (e.g., memory 810, memory 870). The cryptographic hash may be stored when the browser is installed on a computing device (e.g., as part of an initial installation). The cryptographic hash may be stored whenever a setting is changed from within the browser.

In one example implementation, each setting associated with the browser may be separately hashed and stored. Each setting may be identified by, for example, a setting name. In another (similar) example implementation, each setting associated with each user of a computing device including the browser may be separately hashed and stored. In this case, each setting may be identified by, for example, a setting name and a user identification. In yet another example implementation, all (or substantially all) of the settings may be together hashed and stored. In still another (similar) example implementation, all (or substantially all) of the settings may be together hashed and stored for each user of a computing device including the browser.

These example implementations may be combined in any of several combinations. For example, in an example implementation, each setting associated with each user of a computing device including the browser may be separately hashed and stored and all (or substantially all) of the settings may be together hashed and stored for each user of a computing device including the browser. As a result, the hash (e.g., cryptographic hash) associated with all of the settings may be regularly utilized to check if a setting has been tampered with. And, if a setting has been tampered with, the hash associated with each setting may be checked to determine which setting has been tampered with.

In step S310 the cryptographic hash is read. For example, the cryptographic hash or digest may be read, by a processor (e.g., processor 805), from the memory (e.g., memory 810, memory 870). The cryptographic hash may be a previously (e.g., earlier in time) generated cryptographic hash generated based on the settings at that previous time. In an example implementation, as discussed above, one or more of a cryptographic hash associated with all of the settings and/or hash associated with each setting may be read.

In step S315 a cryptographic hash of current system settings is generated. For example, as discussed above, the cryptographic hash may be a fixed size bit string or digest generated, by a processor (e.g., processor 805), using a cryptographic hash function with the settings as input. The cryptographic hash function or algorithm may include at least one key. The at least one key may be unique to the browser, unique to the computing device, unique to a user of the computing device and/or a key generated based on the aforementioned keys. The settings as input may include the setting (e.g., value) alone, the setting name/setting pair, and/or any other combination of characters associated with the settings. However, the cryptographic hash function, the at least one key and the settings (not necessarily the values of the settings) as input used to generate the cryptographic hash should be the same as those used to generate the stored cryptographic hash. The cryptographic hash of current system settings may be a second cryptographic hash generated as a second bit string, such that the second cryptographic hash is based on a plurality of settings associated with the browser at a second time.

Figure 4:
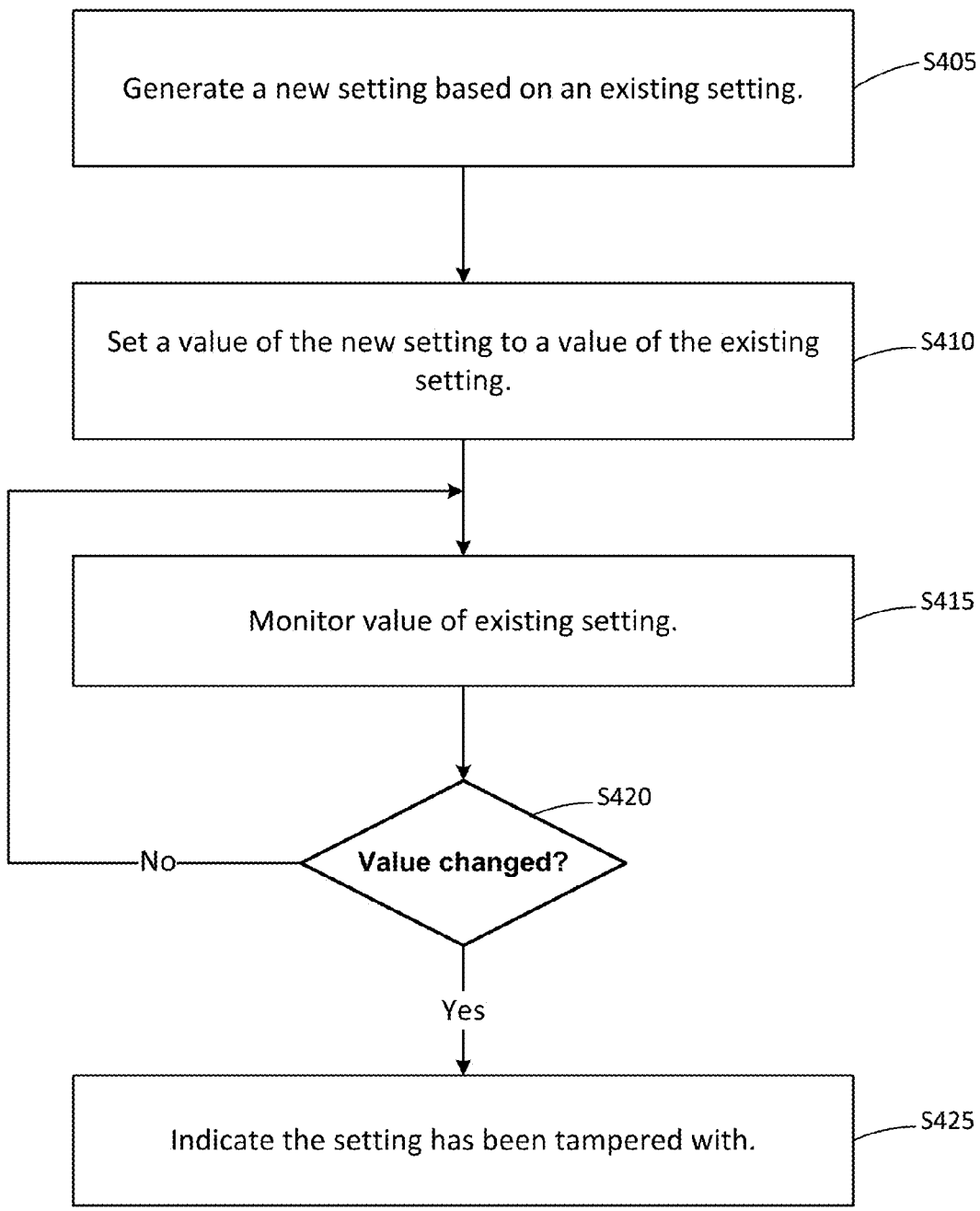

In step S320 the read cryptographic hash is compared to the generated cryptographic hash. For example, the processor (e.g., processor 805), may compare the cryptographic hash or digest by comparing the bit string associated with each cryptographic hash. In step S325 a change is indicated based on the comparison. For example, if the bit string associated with each cryptographic hash are the same, no change in the settings exists. Therefore, no change is indicated. Otherwise, if the bit string associated with each cryptographic hash are not the same, a change in the settings exists. Therefore, a change is indicated. Comparing the read cryptographic hash to the generated cryptographic hash may include determining that a setting associated with the browser has changed and that the setting change was made outside of the browser based on a comparison of the first and second bit strings. If the setting change was made outside of the browser, the setting is set to a default value FIG. 4 is a flowchart of detecting a setting has been tampered with according to at least one example embodiment. As shown in FIG. 4, in step S405 a new setting is generated based on an existing setting. For example, continuing the example above, a new setting may be generated based on the "Open Specific Page" associated variable value defining the web page or URL to open "On Startup". The new setting may be named "On Startup2". The new setting may be generated for insertion, by a processor (e.g., processor 805), during an upgrade or revision process of the browser.

Further, the new setting is configured as the operable setting. In other words, the new setting operationally replaces the existing setting. For example, "On Startup2" is configured as the setting used to determine the web page opened at start-up of the browser. Accordingly, if at any time after generating the new value the existing value changes, the existing value has been tampered with because even the browser is no longer configured to change the existing value. A developer of malware may not have knowledge of the setting name change. Accordingly, if a value associated with the existing setting is changed, the change can only be the result of a malicious act or malware action.

In step S410 a value of the new setting is set to a value of the existing setting. For example, the value of the existing setting may be copied to the new setting upon execution, by a processor (e.g., processor 805), of the upgrade or revision of the browser. For example, the value associated with the new setting named "On Startup2" may be set to "www.myhomepage.com" by copying, by a processor (e.g., processor 805), the value from the existing setting named "On Startup".

In step S415 the value of the existing setting is monitored. For example, the value of the existing setting (e.g., "On Startup") may be monitored, by a processor (e.g., processor 805), in fixed time intervals, at randomly determined times and/or by redundant code. Monitoring may include reading the value of the existing setting in fixed time intervals. Monitoring may include comparing the value of the existing setting to a stored value in fixed time intervals.

In step S420, whether the value of the existing setting has changed is determined. If the value of the existing setting has changed, processing continues to step S425. Otherwise, processing returns to step S415. For example, the value of the existing setting may be determined to have changed, by a processor (e.g., processor 805), if the stored value is different than the read value during the monitoring step.

In step S425 the setting is indicated as having been tampered with. For example, if the value of the existing setting is determined to have changed, the setting is indicated as having been tampered with. Otherwise, the setting is not indicated as having been tampered with (unless there is some other indicia of being tampered with that is not an element of this process).

Figure 5:
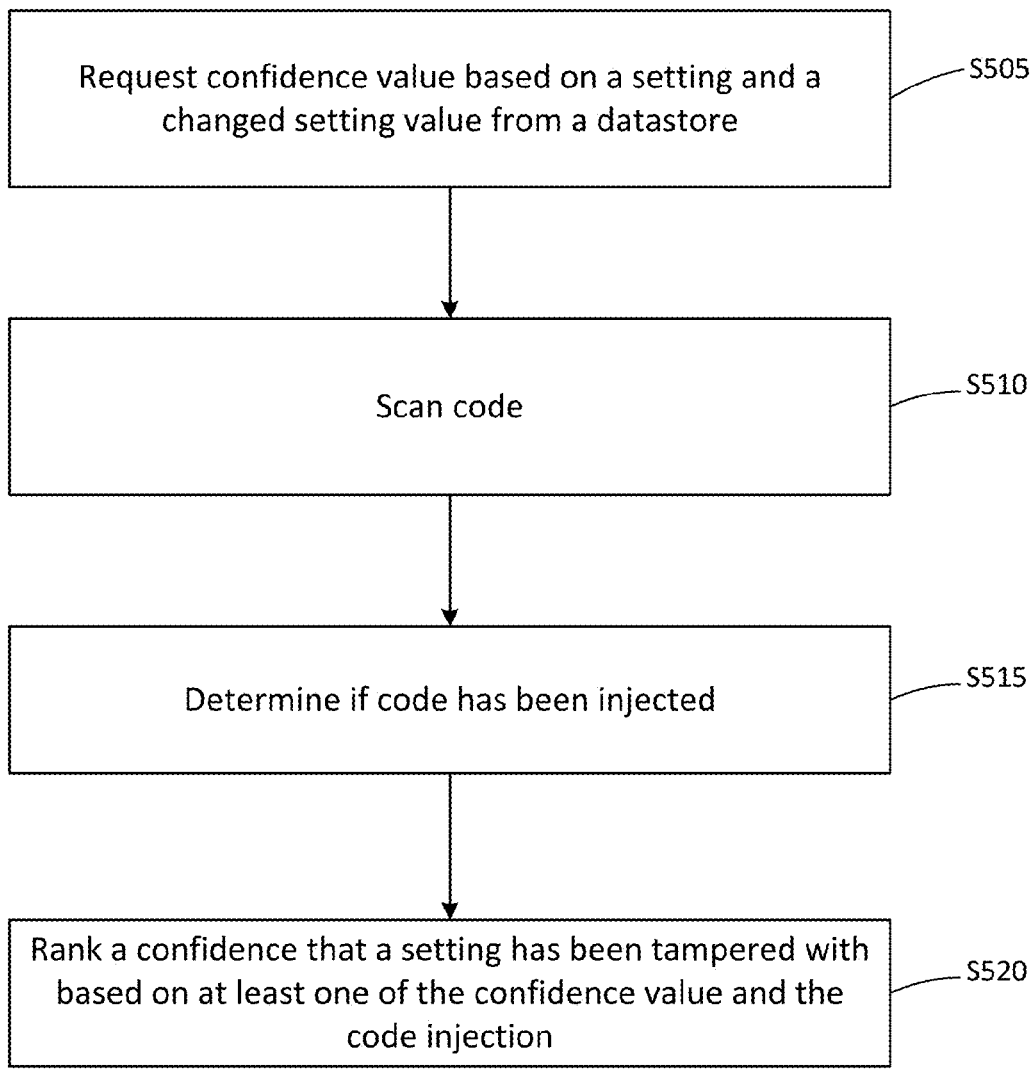
FIG. 5 is a flowchart of a method of ranking a confidence a setting has been tampered with according to at least one example embodiment.

FIG. 5 is a flowchart of a method of ranking a confidence that a setting has been tampered with according to at least one example embodiment. As shown in FIG. 5, in step S505 a confidence value is requested from a datastore. The confidence value is based on a setting and a changed setting value. For example, the datastore (e.g., memory 870) may store confidence levels associated with tampered settings and settings. The confidence levels may be stored as a corresponding setting, setting value (the tampered value) and confidence level. Therefore, the request could include a message including the setting and setting value. After receiving the message, a processor (e.g., CPU 855) can retrieve the confidence value using a look-up in the memory (e.g., memory 870) based on the setting and setting value.

In step S510 code associated with a browser is scanned. For example, the code may be scanned, by a processor (e.g., processor 805), in order to detect any type of code segment (e.g., a dynamic link library (DLL)) that is not part of the browser code. In other words, the code associated with the browser is known at the time the browser is placed/distributed for use. Therefore, any code, code segments, lines of code, and/or the like that is not in the code when the browser is placed/distributed for use (e.g. as the most recent updated version) may be consider malicious and/or malware. For example, an injected DLL may be an indication that some malware is installed on the user's system, and that observed changes in settings are thus more likely to be the result of tampering. Code injected into the browser and running may be configured to (by the malware code) change settings in a way that appears legitimate to the browser code.

In step S515 whether code has been injected into the browser is determined. For example, if any code, code segments, lines of code, and/or the like that is not in the code when the browser is placed/distributed for use is found during the scan, it is determined that code has been injected into the browser. In some implementations, an additional determination may determine if the injected code is associated with the aforementioned setting and setting value that have a confidence value indicating a setting has been tampered with.

In step S520, a confidence that a setting has been tampered with is ranked. The ranking is based on at least one of the confidence value and whether code has been injected. For example, the confidence value may be on a scale (e.g., 0-10, 0-100, and the like). The scale may have associated ranges (e.g., 0-3=low confidence, 4-7=intermediate confidence, and 8-10=high confidence) for confidence that a setting has been tampered with. If code has been injected into the browser, the confidence value may be incremented. Alternatively, or in addition, if code has been injected into the browser and the code is associated with the aforementioned setting and setting value corresponding to the confidence value, the confidence range may be incremented (e.g., an intermediate confidence is incremented to a high confidence).

In one implementation, the steps described above with regard to FIG. 4 may be implemented not only to indicate that a setting has been tampered with, but to determine that the setting change has a high probability or confidence of having been the result of a malicious act or malware action (for use in determining confidence as described in FIG. 5). For example, the new setting described above replaces an existing setting in a new version of the software (e.g., browser). Therefore if the setting changes in any way there is a high confidence the setting was tampered with. The setting and the value associated with the existing setting may be stored (e.g., in memory 870) with a corresponding confidence value indicating a high confidence that the setting was tampered with for future use (as described in FIG. 5). Any stored data may be anonymous in that there is no stored reference to the computing device or the user of the computing device.

Figure 6:
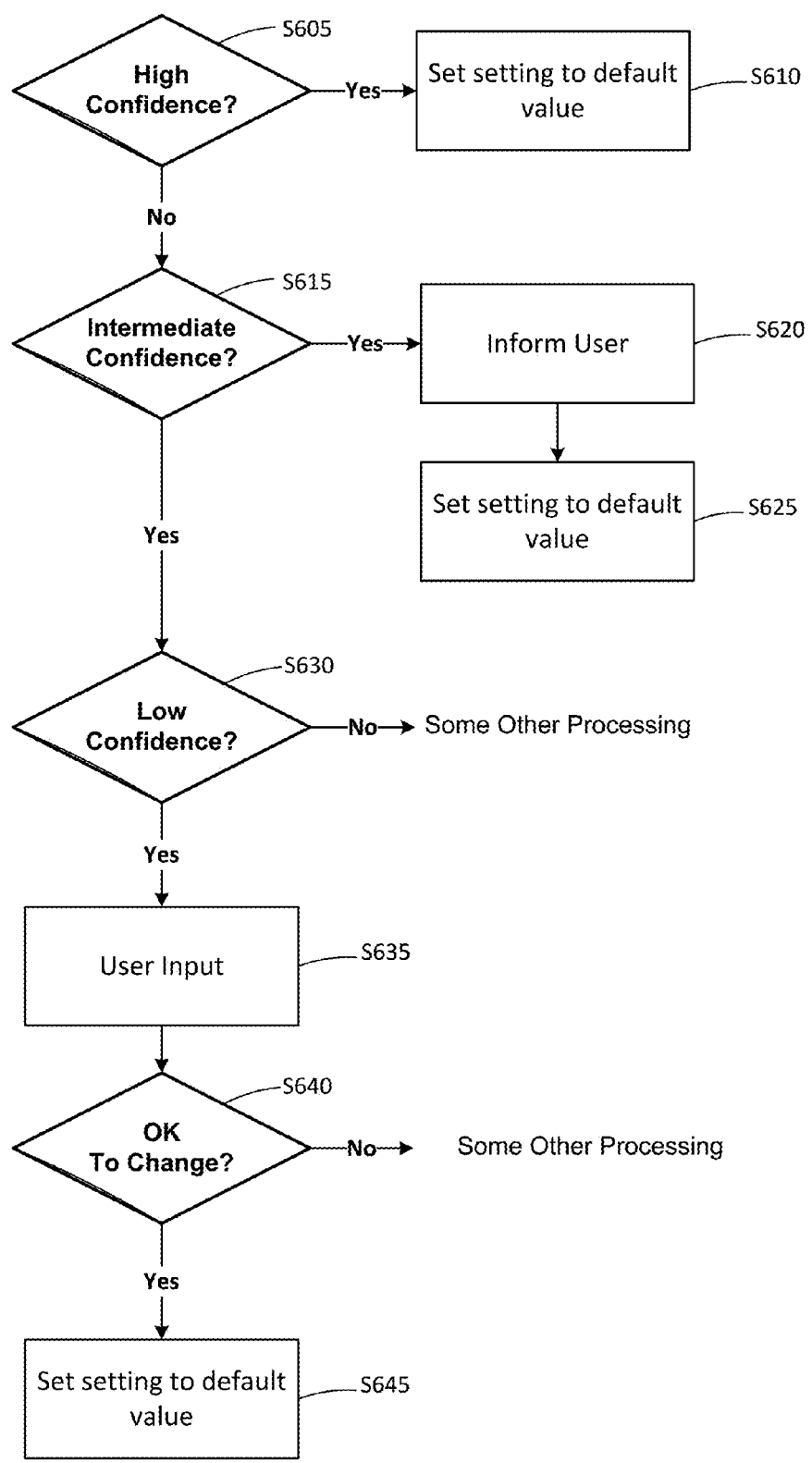
FIG. 6 is a flowchart of a method of reverting a setting based on confidence according to at least one example embodiment.

FIG. 6 is a flowchart of a method of reverting a setting based on confidence according to at least one example embodiment. As shown in FIG. 6, in step S605, whether a high confidence that a setting has been tampered with is determined. If a high confidence that a setting has been tampered with is determined, processing moves to step S610. Otherwise, processing continues to step S615. For example, if, as described above, a high confidence that a setting has been tampered with exists, it may be desirable to take action without informing a user. Therefore, in step S610, the setting is set to a default value. For example, as discussed above, the default value may be a system default value (e.g., an install initial value) or a last known setting stored in a datastore. For example, the "Open Specific Page" associated variable value defining the web page or URL to open "On Startup" may be set back to "www.myhomepage.com".

Figure 7A:
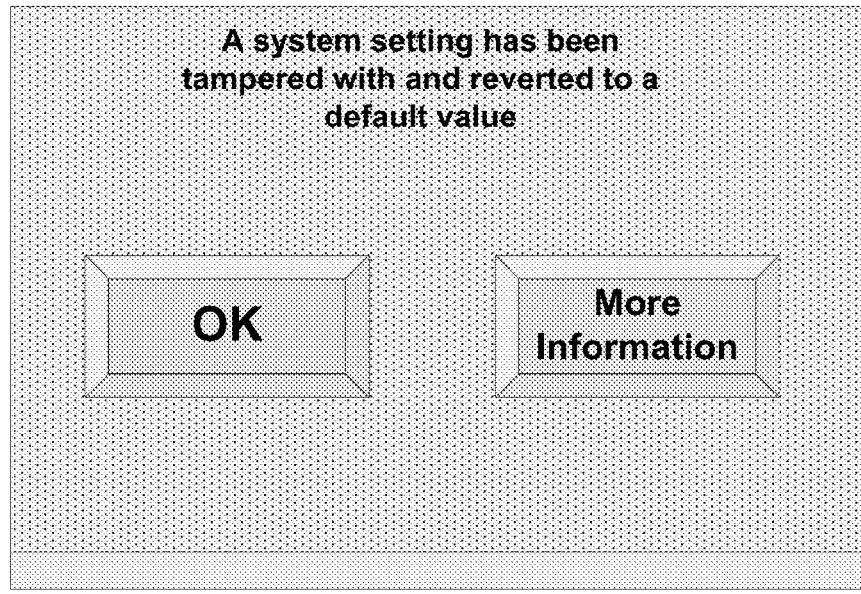
FIGS. 7A and 7B are schematic diagrams of windows according to at least one example embodiment.

In step S615 whether an intermediate confidence that a setting has been tampered with is determined. If an intermediate confidence is determined, processing moves to step S620. Otherwise, processing continues to step S630. For example, if, as described above, an intermediate confidence that a setting has been tampered with exists it may be desirable to take action and informing a user. Therefore, in step S620, a user is informed of the setting as having been tampered with. For example, a window (as shown in FIG. 7A) may pop-up to inform the user that a setting has been tampered with. The user may then acknowledge the setting change.

In step S625, the setting is set to a default value. For example, as discussed above, the default value may be a system default value (e.g., an install initial value) or a last known setting stored in a datastore. For example, the "Open Specific Page" associated variable value defining the web page or URL to open "On Startup" may be set back to "www.myhomepage.com".

Figure 7B:
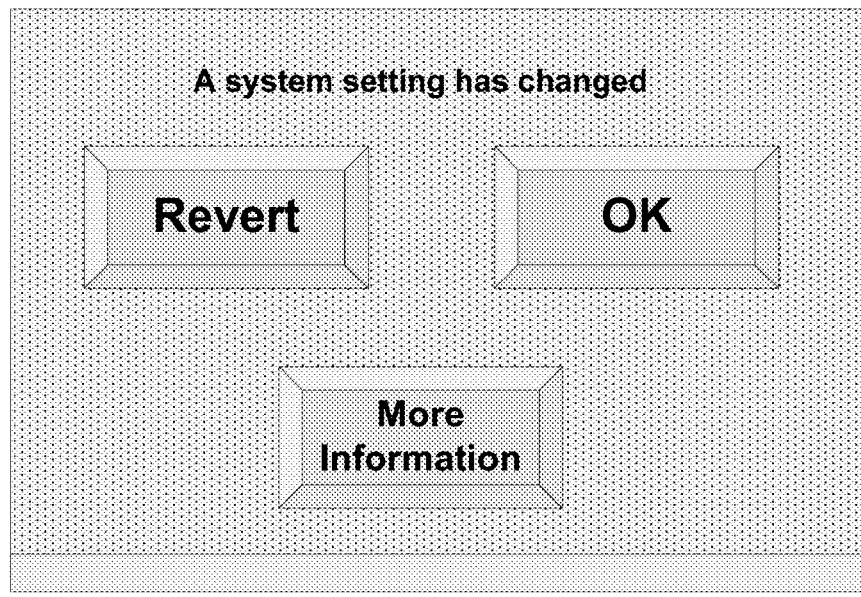

In step S630 whether or not a low confidence that a setting has been tampered with is determined. If a low confidence is determined, processing moves to step S635. Otherwise, some other processing is performed. For example, if, as described above, a low confidence that a setting has been tampered with exists it may be desirable to take action with user permission. Therefore, in step S635, a user is informed of the setting as having been tampered with. For example, a window (as shown in FIG. 7B) may pop-up to inform the user that a setting has been tampered with. However, instead of acknowledging the change, the user permits the system to revert the setting to a prior or default value.

Accordingly, in step S640, whether it is OK to change the setting is determined. If it is OK to change the setting, processing moves to step S645. Otherwise, some other processing is performed. For example, the user may press the 'Revert' button on the window shown in FIG. 7B as an indication that it is OK to change the setting. Finally, in step S645, the setting is set to a default value. For example, as discussed above, the default value may be a system default value (e.g., an install initial value) or a last known setting stored in a datastore. For example, the "Open Specific Page" associated variable value defining the web page or URL to open "On Startup" may be set back to "www.myhomepage.com".

FIGS. 7A and 7B are schematic diagrams of windows according to at least one example embodiment. The window of FIG. 7A may be utilized to inform a user that a setting has changed, or more particularly, been tampered with, and reverted to a default value. The window of FIG. 7A allows the user to acknowledge (by clicking 'OK') that the system has acted accordingly. The window of FIG. 7A also allows the user to view additional information by clicking on 'More Information'. The additional information may include the name of the changed setting, the value the setting was changed to, the time the setting was changed, (if known) what (e.g., program) changed the setting, and/or the like.

The window of FIG. 7B may be utilized to inform a user that a setting has changed, or more particularly, been tampered with. The window of FIG. 7B allows the user to instruct the system to revert (or change the setting to a default value) by clicking on 'Revert'. The window of FIG. 7B also allows the user to acknowledge (by clicking 'OK') that the setting has changed with no other actions taken. The window of FIG. 7B also allows the user to view additional information by clicking on 'More Information'. The additional information may include the name of the changed setting, the value the setting was changed to, the time the setting was changed, (if known) what (e.g., program) changed the setting, and/or the like.

FIG. 8 illustrates a block diagram of an apparatus according to at least one example embodiment. As shown in FIG. 8, the system 800 includes at least one processor 805 and at least one memory 810. The at least one processor 805 and the at least one memory 810 are communicatively coupled via bus 815. The system 800 may be, for example, an element of a computing device (e.g., personal computer, a laptop computer and the like).

In the example of FIG. 8, the system 800 may be at least one computing device and should be understood to represent virtually any computing device configured to perform the methods described herein. As such, the system 800 may be understood to include various standard components which may be utilized to implement the techniques described herein, or different or future versions thereof. By way of example, the system 800 is illustrated as including the at least one processor 805, as well as the at least one memory 810 (e.g., a non-transitory computer readable storage medium) respectively.

Thus, as may be appreciated, the at least one processor 805 may be formed on a substrate and may be utilized to execute instructions stored on the at least one memory 810, so as to thereby implement the various features and functions described herein, or additional or alternative features and functions. Of course, the at least one processor 805 and the at least one memory 810 may be utilized for various other purposes. In particular, it may be appreciated that the at least one memory 810 may be understood to represent an example of various types of memory and related hardware and software which might be used to implement any one of the modules described herein. Systems and/or methods described above and/or below may include data and/or storage elements. The data and/or storage elements (e.g., data base tables) may be stored in, for example, the at least one memory 810.

As shown in FIG. 8, the at least one memory 810 includes code that can be executed to provide a hash module 820, a revert module 825, a detection module 830, and a ranking module 835. The hash module 820, the revert module 825, the detection module 830, and the ranking module 835 (together) may be configured to implement the methods described above with regard to FIGS. 1-5, each described in more detail above and may not be described further for the sake of brevity.

According to example implementations, the hash module 820 may be configured to generate and store a cryptographic hash based on browser settings. For example, the hash module 820 may generate a fixed size bit string or digest generated using a cryptographic hash function with the settings as input. In this example, the cryptographic hash function or algorithm may include a Message-Digest Algorithm (MDA), a Secure Hash Algorithm (SHA), and the like. For example, the hash module 820 may generate a variable size bit string or digest generated using a cryptographic hash function with the settings as input. In this example, the cryptographic hash function or algorithm may include a HAVAL algorithm, and the like.

The cryptographic hash function or algorithm may include at least one key. The at least one key may be unique to the browser, unique to the computing device, unique to a user of the computing device and/or a key generated based on the aforementioned keys. For example, the cryptographic hash function or algorithm may use a key that is unique to the computing device to generate the cryptographic hash or digest. The cryptographic hash or digest may also be encrypted using the key that is unique to the user prior to storing the cryptographic hash or digest in the datastore.

The settings as input may include the setting (e.g., value) alone, the setting name/setting pair, and/or any other combination of characters associated with the settings. The cryptographic hash may be stored, in a datastore associated with a memory (e.g., memory 810 and/or memory 870).

According to example implementations, the revert module 825 may be configured to change a setting to a default value. For example, as discussed above, the setting may be set or reverted to a default value. The default value may be a system default value (e.g., an install initial value) or a last known setting stored in association with the revert module 825. In other words, the revert module 825 may be configured to store a default for each setting associated with a browser as well as a history of changes and/or last change associated with each setting. Accordingly, the revert module 825 may be configured to change the "Open Specific Page" associated variable value defining the web page or URL to open "On Startup" back to a value based on a value stored in (or in association with) the revert module 825 (e.g., "www.myhomepage.com").

According to example implementations, the detection module 830 may be configured to detect that a setting has been tampered with. For example, in one implementation, the detection module 830 may be configured to compare two cryptographic hash strings or digests. If the two cryptographic hash strings or digests are different, a setting has been tampered with. For example, in another implementation, the detection module 830 may be configured to monitor a copied setting to determine if the copied setting has been tampered with.

According to example implementations, the ranking module 835 may be configured to rank a confidence associated with a tampered with setting. For example, in one implementation, the ranking module 835 may be configured to retrieve a confidence value from a datastore. For example, in another implementation, the ranking module 835 may be configured to scan browser code to determine if code has been injected into the browser code. The confidence may be based on one or more of the confidence value or the determination as to whether code has been injected.

The hash module 820, the revert module 825, the detection module 830, and the ranking module 835 may be elements of a browser, an operating system and/or a runtime. For example, the hash module 820, the revert module 825, the detection module 830, and the ranking module 835 may be elements of a browser or web based operating system (Browser-OS). A Browser-OS may be a bootable version of a web browser (including a browser, a media player and a file system. The Browser-OS may store all of a user applications and data on the Web, as opposed to a local hard drive. The Browser-OS (e.g., Chrome-OS®) may replace a traditional operating system (e.g., Windows®). Therefore, the hash module 820, the revert module 825, the detection module 830, and the ranking module 835 may be configured to detect if browser settings have been tampered with and whether to revert the setting to a default value.

In some implementations the hash module 820, the revert module 825, the detection module 830, and the ranking module 835 may not have access to all information necessary to implement the above functions and features. Therefore, as shown in FIG. 8 the system 800 can also include a sync server 850 that includes one or more processors 855, one or more memories 870, an operating system 860, and an identifier database 865. The identifier database 865 can store unique identifiers to enable syncing between various user sessions on different client computing devices.

For example, in some implementations, a user account allows a user to authenticate to system services (e.g., web applications) and receive authorization to access them. To log into a user account, a user may authenticate herself with a password or other credentials for the purposes of accounting, security, and resource management, for example. Once the user has logged on (e.g., to a web browser, to a computing device, etc.), an operating system may use an identifier such as an integer to refer to the user, rather than a username. For example, the username may be correlated with a user identifier. A system (e.g., sync server 850) may reconcile and validate the proper ownership of user accounts, and can permanently link ownership of those user accounts to particular individuals by assigning a unique identifier to validated account login identifiers (e.g., user names and passwords, secure identifiers, etc.). The system may validate that individuals only have account login identifiers for the appropriate systems and applications, for example according to an organization's business policies, access control policies, and various application requirements.

In some implementations, for example, when a user signs into a web browser or a certain device, all of the user's bookmarks, extensions, web applications, theme, other browser preferences and/or settings may be loaded from a sync server 850 via a network 845 and a network interface 840. Accordingly, the user's bookmarks, extensions, web applications, theme, other browser preferences and/or settings may be saved (e.g., in memory 870) and synced to a user's account (e.g., using identifier database 865). The user can then load these settings anytime the user signs into the web browser on other computers and devices. Changes to browser settings, for example, may be synced instantaneously to the account, and may be automatically reflected on other computers where the user has signed in (and enabled syncing).

Changes to settings on one computing device may be automatically copied (e.g., via sync server 850) from other computers (for example, if the user has enabled that sync feature). Synced data may be encrypted when it travels between computing devices to keep information secure. Further, passwords may be encrypted on computing devices using a cryptographic key. The sync server 850 may include a central service configured to hash settings that detects if suddenly a large number of devices request hashes for specific new settings and in this case refuse to provide hashes. The sync server 850 may include user submitted information about inconsistencies that are then used to build or improve a model to calculate confidence. The sync server 850 may report detections of inconsistencies to estimate the magnitude of infection rates.

Accordingly, information associated with browser settings (as well as the settings themselves) may be read from a file (e.g., XML file) or data store (e.g., database) downloaded (e.g., synchronized) from the sync server 850 and stored in memory 810. The hash module 820, the revert module 825, the detection module 830, and/or the ranking module 835 may access the file and/or data store in order to supplement and or generate the information about settings.

Although not shown, one or more of the hash module 820, the revert module 825, the detection module 830, and the ranking module 835 may be elements of memory 870 and executed by CPU 855. For example, the hash module 820 may be a module associated with memory 870. Accordingly, settings changes may result in the Sync Server 850 generating the cryptographic hash instead of the user device. The resultant cryptographic hash may be communicated to the user device for storage in memory 810. Accordingly, the cryptographic hash may be stored in memory 810 and/or memory 870.

As will be appreciated, the system 800 illustrated in FIG. 8 may be implemented as an element of and/or an extension of the generic computer device 900 and/or the generic mobile computer device 950 described below with regard to FIG. 9. Alternatively, or in addition to, the system 800 illustrated in FIG. 8 may be implemented in a separate system from the generic computer device 900 and/or the generic mobile computer device 950 having some or all of the features described below with regard to the generic computer device 900 and/or the generic mobile computer device 950.

As will be appreciated, the system 800 illustrated in FIG. 8 may be implemented as an element of and/or an extension of the generic computer device 900 and/or the generic mobile computer device 950 described below with regard to FIG. 9. Alternatively, or in addition to, the system 800 illustrated in FIG. 8 may be implemented in a separate system from the generic computer device 900 and/or the generic mobile computer device 950 having some or all of the features described below with regard to the generic computer device 900 and/or the generic mobile computer device 950.

Figure 9:
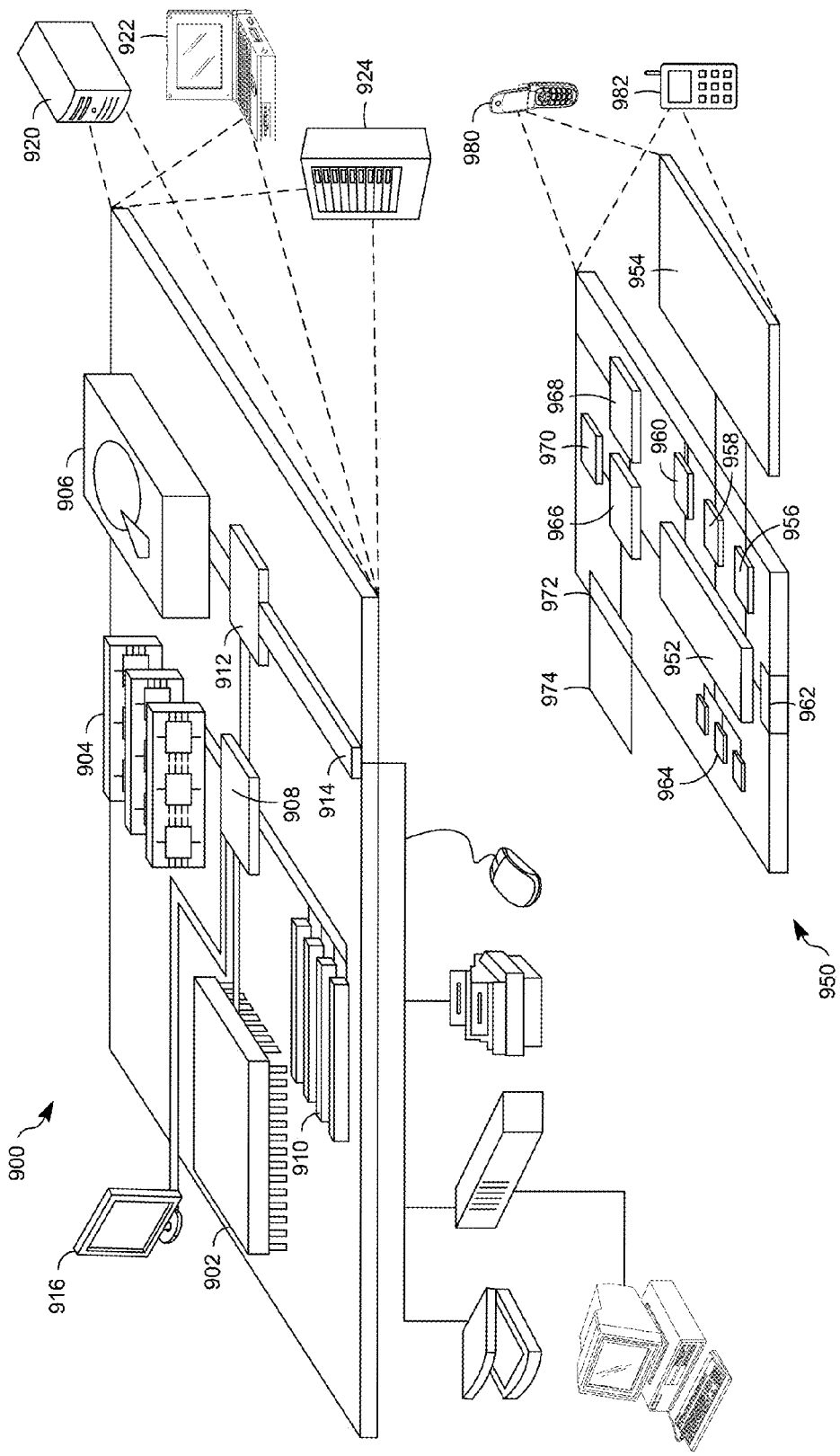
FIG. 9 is a schematic block diagram of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, LTE, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether that particular combination has been specifically enumerated in the accompanying claims at this time.

What is claimed is:

1. A computer implemented method, comprising:
   generating a first cryptographic hash based on at least one setting associated with a browser at a first time;
   storing the first cryptographic hash as a first bit string;
   generating a second cryptographic hash as a second bit string, wherein the second cryptographic hash is based on the at least one setting associated with the browser at a second time;
   determining, by a processor, that a setting associated with the browser has changed and that the setting change was made outside of the browser based on a comparison of the first and second bit strings; and
   if the setting change was made outside of the browser, setting the setting to a default value.

2. The computer implemented method of claim 1, wherein the at least one setting associated with a browser is a data structure that includes a canonical representation that is then serialized to a string prior to being cryptographically hashed.

3. The computer implemented method of claim 1, wherein the first cryptographic hash and the second cryptographic hash are performed by a central service associated with a remote computing device.

4. The computer implemented method of claim 1, wherein setting the setting to a default value includes:
   determining a confidence level based on the setting associated with the browser, and
   displaying a window based on the confidence level associated with the changed setting.

5. The computer implemented method of claim 1, comprising:
   requesting a confidence level based on the changed setting from a remote datastore;
   determining if malicious code has been injected into code associated with the browser; and
   ranking a confidence that the setting has been tampered with based on at least one of the confidence level and the determining if malicious code has been injected.

6. The computer implemented method of claim 1, wherein the default value is one of an install initial value and a last known setting stored in a datastore.

7. The computer implemented method of claim 1, wherein
   the bit strings are generated based on a cryptographic hash function including at least one key as input, and
   the at least one key is at least one of unique to the browser, unique to a computing device, and unique to a user of the computing device.

8. The computer implemented method of claim 1, wherein at least one bit string is encrypted using a key that is unique to the user prior to storing the bit string in a datastore.

9. The computer implemented method of claim 1, wherein the default value is one of a system default value and a last known setting stored in a datastore.

10. The computer implemented method of claim 1, further comprising:
    generating a new setting associated with the browser based on an existing setting associated with the browser;
    setting a value associated with the new setting to a corresponding value of the existing setting;
    monitoring the existing setting and
    determining a setting associated with the browser has changed if the existing setting changes.

11. The computer implemented method of claim 10, wherein the new setting is generated during an upgrade process associated with the browser.

12. The computer implemented method of claim 10, further comprising storing information corresponding to the changed setting associated with the browser in a datastore.

13. A non-transitory computer-readable storage medium having stored thereon computer executable program code which, when executed on a computer system, causes the computer system to perform steps comprising:
    generate a first cryptographic hash based on at least one setting associated with a browser at a first time;
    store the first cryptographic hash as a first bit string;
    generate a second cryptographic hash as a second bit string, wherein the second cryptographic hash is based on the at least one setting associated with the browser at a second time;
    determine, by a processor, that a setting associated with the browser has changed and that the setting change was made outside of the browser based on a comparison of the first and second bit strings; and
    if the setting change was made outside of the browser, set the setting to a default value.

14. The computer implemented method of claim 13, wherein the at least one setting associated with a browser is a data structure that includes a canonical representation that is then serialized to a string prior to being cryptographically hashed.

15. The computer implemented method of claim 13, wherein the first cryptographic hash and the second cryptographic hash are performed by a central service associated with a remote computing device.

16. The non-transitory computer-readable storage medium of claim 13, wherein setting the setting to a default value includes:
- determining a confidence level based on the setting associated with the browser, and
- displaying a window based on the confidence level associated with the changed setting.

17. The non-transitory computer-readable storage medium of claim 13, wherein the steps further comprise:
- requesting a confidence level based on the changed setting from a remote datastore;
- determining if malicious code has been injected into code associated with the browser; and
- ranking a confidence that the setting has been tampered with based on at least one of the confidence level and the determining if malicious code has been injected.

18. The non-transitory computer-readable storage medium of claim 13, wherein the default value is one of an install initial value and a last known setting stored in a datastore.

19. The non-transitory computer-readable storage medium of claim 13, wherein
- the bit strings are generated based on a cryptographic hash function including at least one key as input, and
- the at least one key is at least one of unique to the browser, unique to a computing device, and unique to a user of the computing device.

20. The non-transitory computer-readable storage medium of claim 13, wherein at least one bit string is encrypted using a key that is unique to the user prior to storing the bit string in a datastore.

* * * * *